United States Patent

Ivantysyn

Patent Number: 5,983,781
Date of Patent: Nov. 16, 1999

[54] SLIDING BEARING WITH SELF-ADJUSTED LOAD BEARING CAPACITY

[75] Inventor: Jaroslav Ivantysyn, Schleswig-Holstein, Germany

[73] Assignee: Sauer Inc., Ames, Iowa

[21] Appl. No.: 08/858,991

[22] Filed: May 20, 1997

[30] Foreign Application Priority Data

Sep. 6, 1996 [DE] Germany .......................... 196 36 274

[51] Int. Cl.⁶ ........................................................ F01B 3/00
[52] U.S. Cl. ................................ 92/71; 92/158; 417/269; 184/6.17; 384/121
[58] Field of Search .............................. 92/12.2, 71, 72, 92/158; 74/60; 417/269; 184/6.17; 384/121, 122, 123, 124, 307, 308

[56] References Cited

U.S. PATENT DOCUMENTS

| | | | |
|---|---|---|---|
| 3,437,015 | 4/1969 | Kubilos | 417/269 |
| 3,866,518 | 2/1975 | Miyao et al. | 91/488 |
| 4,183,288 | 1/1980 | Miyao | 91/488 |
| 4,359,933 | 11/1982 | Fricke | 92/158 |
| 4,516,475 | 5/1985 | Fricke | 92/72 |
| 4,546,692 | 10/1985 | Lotter et al. | 384/121 |
| 4,772,188 | 9/1988 | Kimura et al. | 384/123 |
| 4,893,548 | 1/1990 | Kawahara et al. | 91/488 |
| 5,011,377 | 4/1991 | Sagawa et al. | 417/269 |
| 5,685,215 | 11/1997 | Jepson et al. | 92/71 |

*Primary Examiner*—Thomas E. Denion
*Attorney, Agent, or Firm*—Zarley, McKee, Thomte, Voorhees & Sease

[57] ABSTRACT

A sliding bearing, particularly for slippers of hydrostatic piston machines, with a support having a supporting surface on which slides a sliding piece having a sliding and sealing surface. Between the supporting surface and the sealing part of the sliding and sealing surface is a bearing gap height ($h_2$) and in the sliding and sealing surface at least one shallow recess with a depth (h) bordered by the sealing part of the sliding and sealing surface. At least one connecting channel is connected to a pressure source of the lubricating fluid so that a lubrication gap with a height ($h_2+h$) is formed. The lubrication gap is in accordance with the invention designed in such a way that a self-adjusting load bearing capacity dependent on the gap height ($h_2$) is achieved, whereby in the gap such a flow is created, under the influence of which the velocity of the lubricating fluid is positive (greater than zero) in all directions and the pressure gradient is declining in the flow direction.

23 Claims, 17 Drawing Sheets

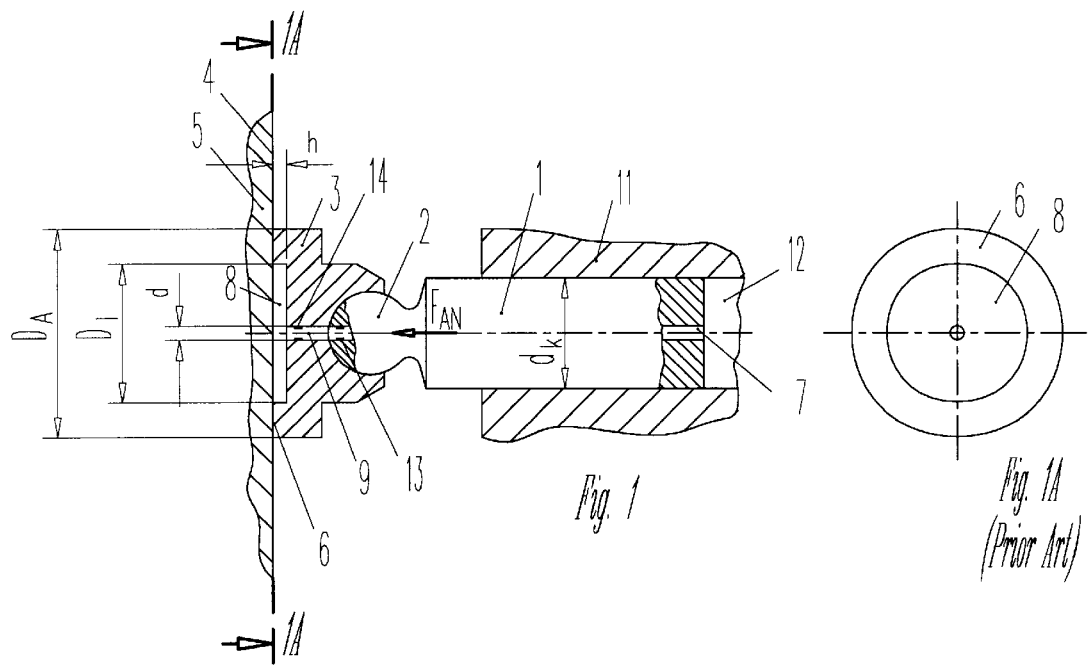
Fig. 1
Fig. 1A (Prior Art)
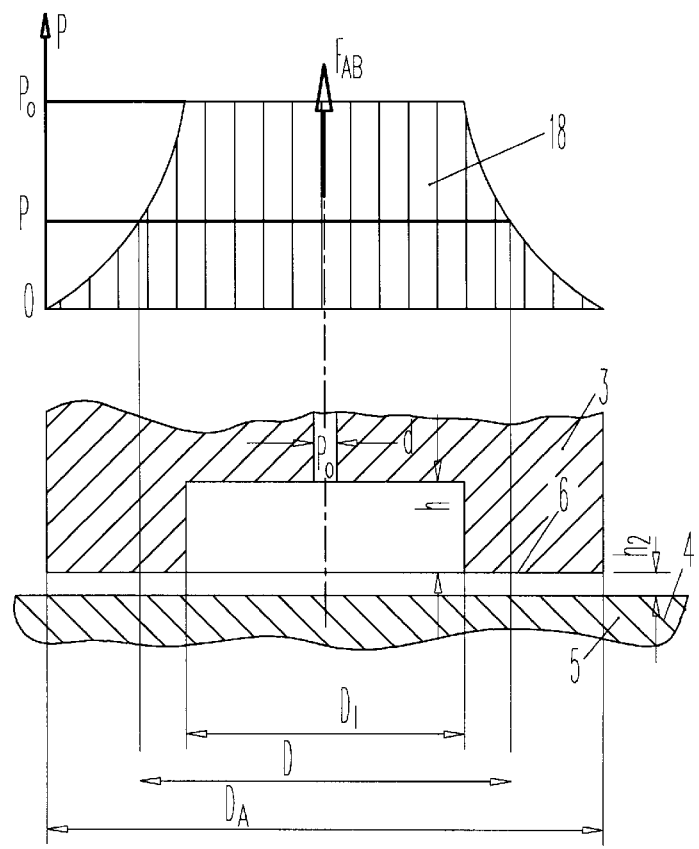
Fig. 2 (Prior Art)

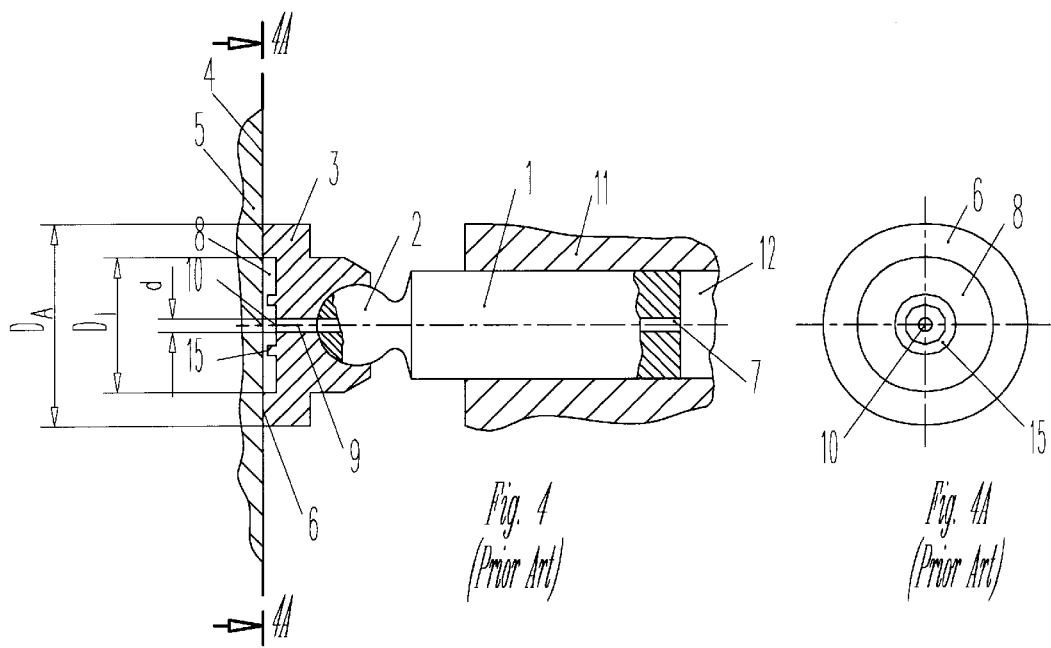
Fig. 4
(Prior Art)
Fig. 4A
(Prior Art)
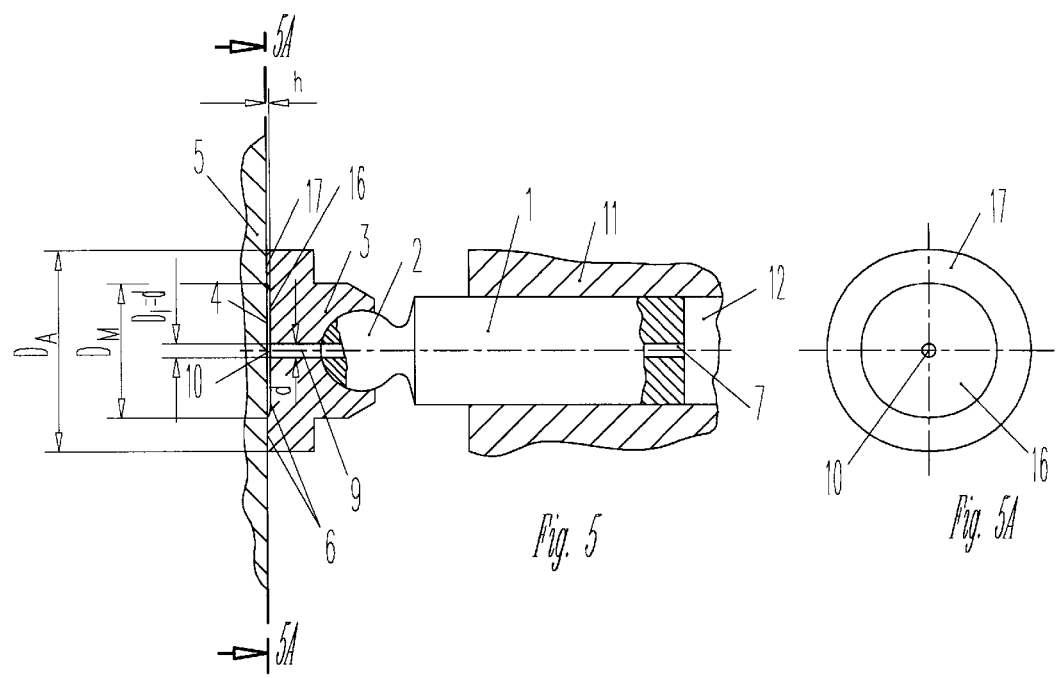
Fig. 5
Fig. 5A

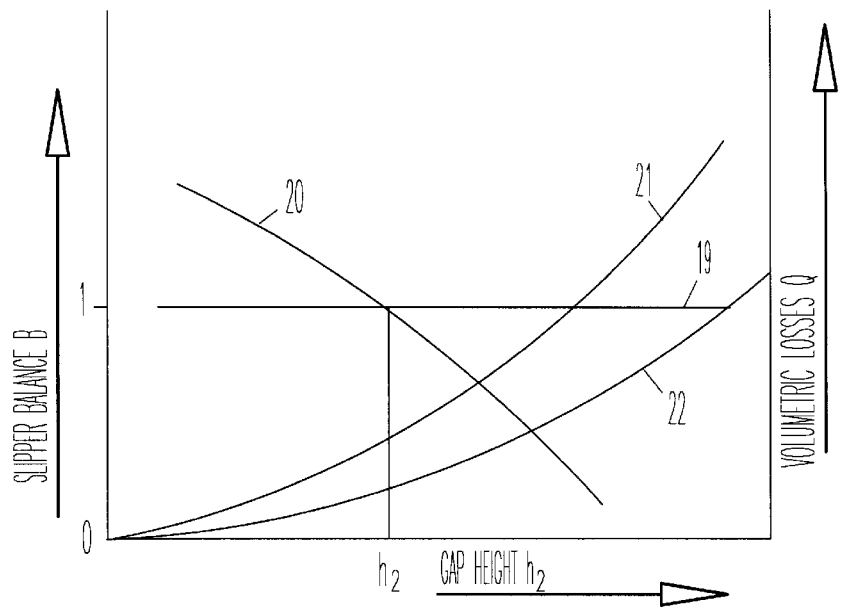
Fig. 8
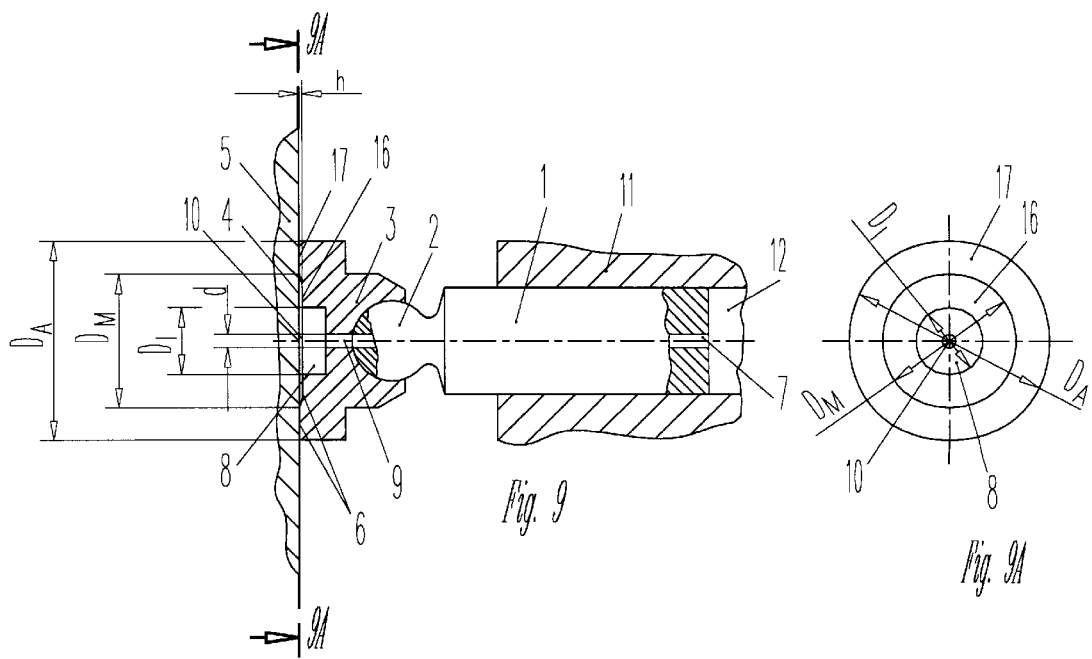
Fig. 9
Fig. 9A

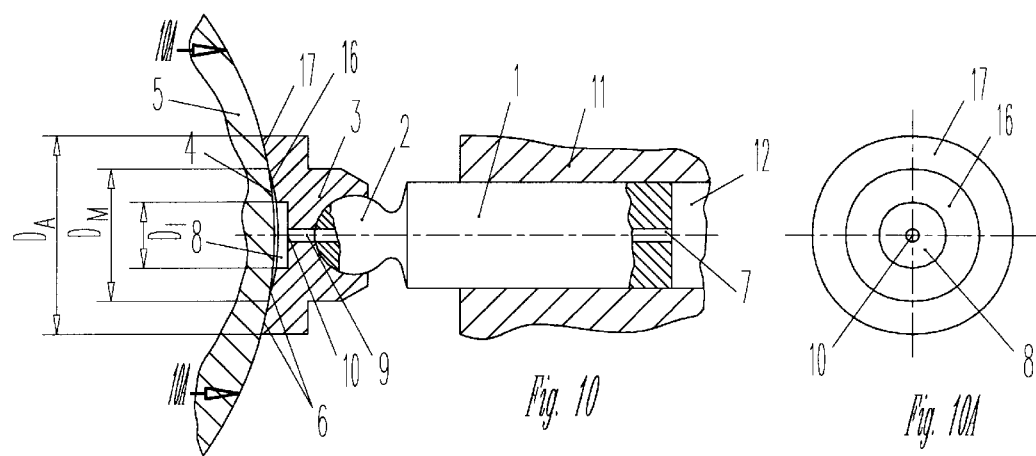
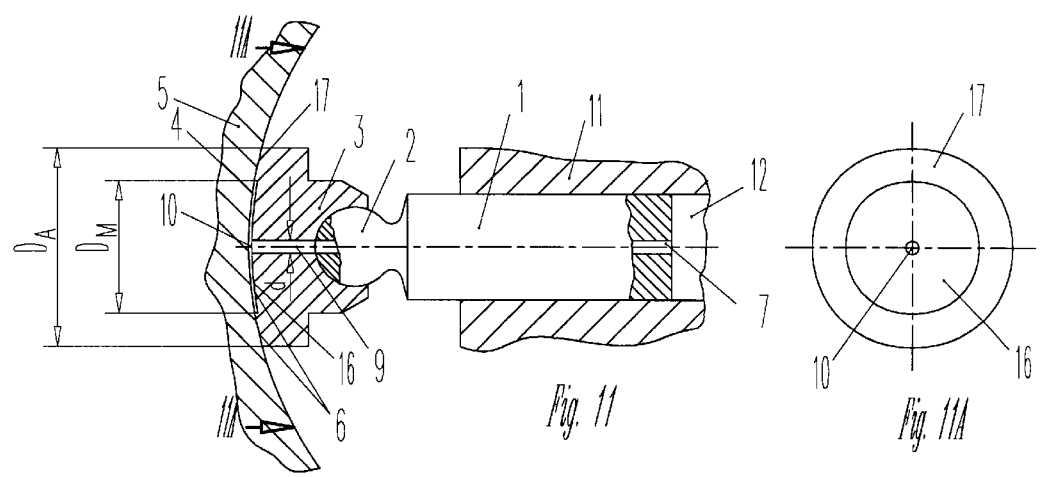

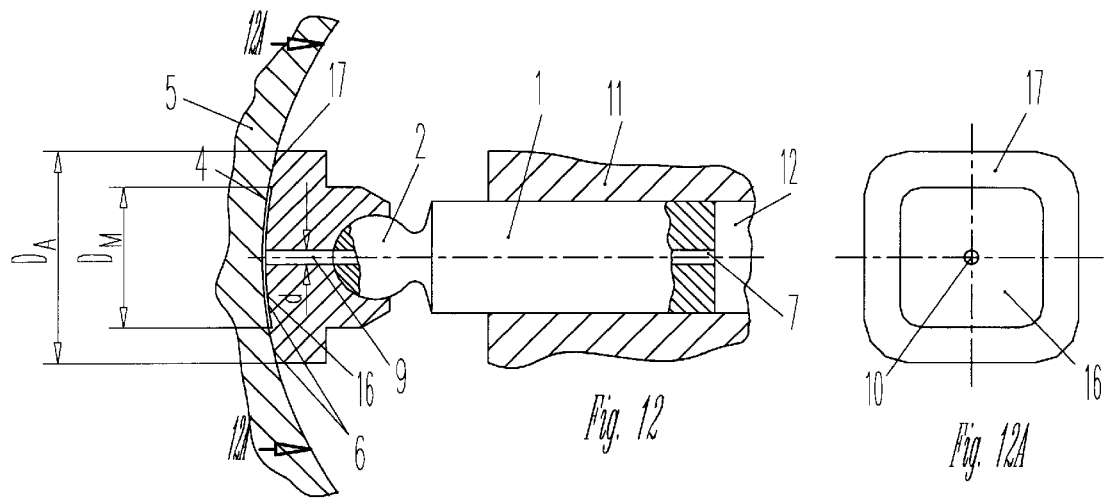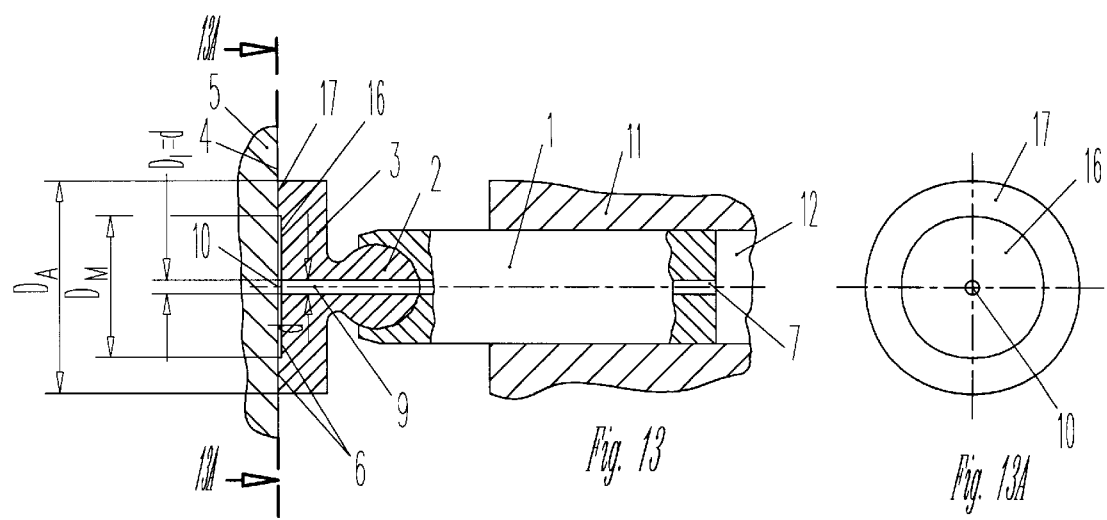

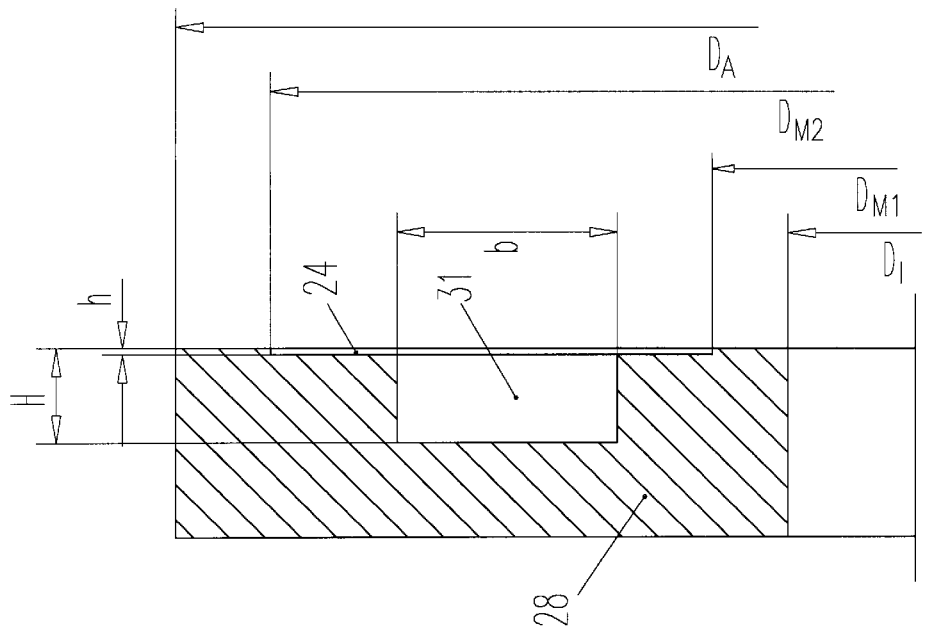
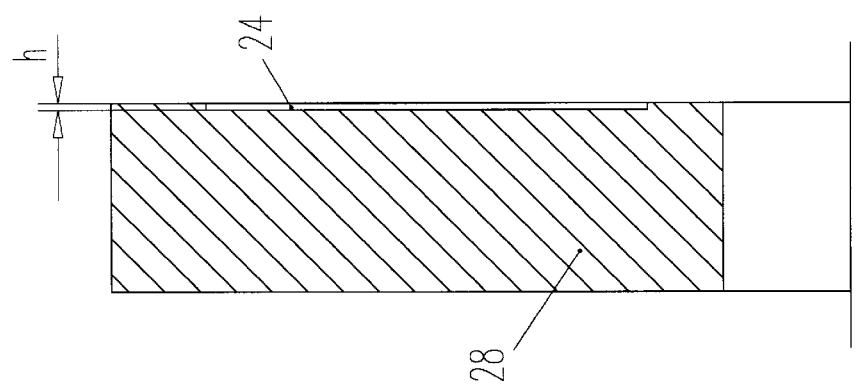
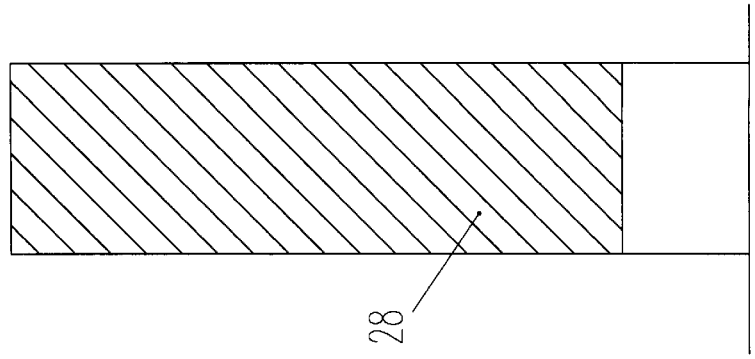

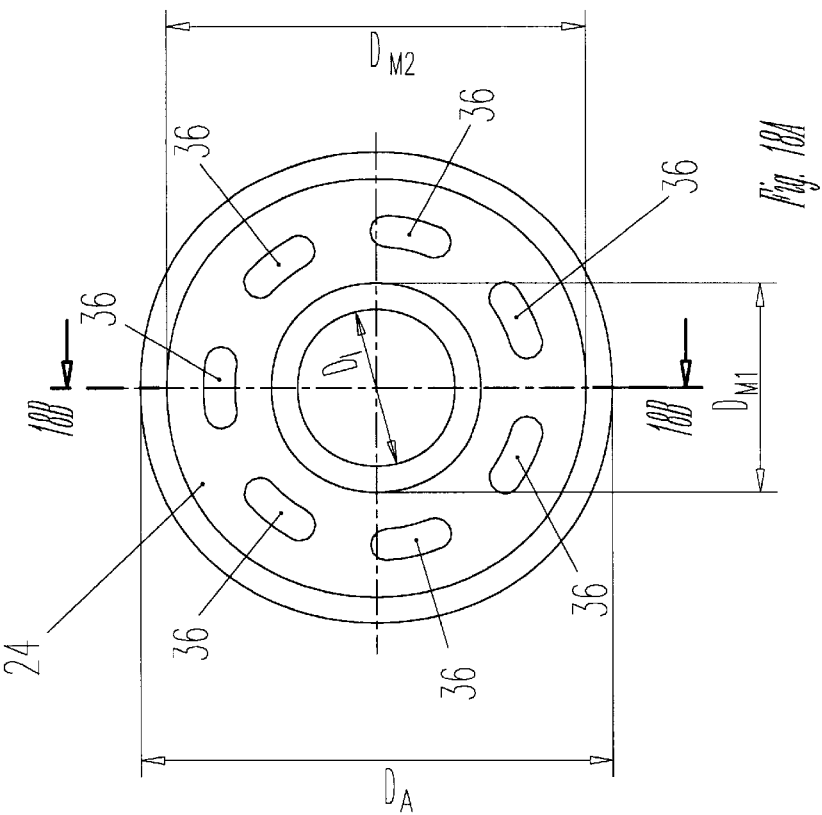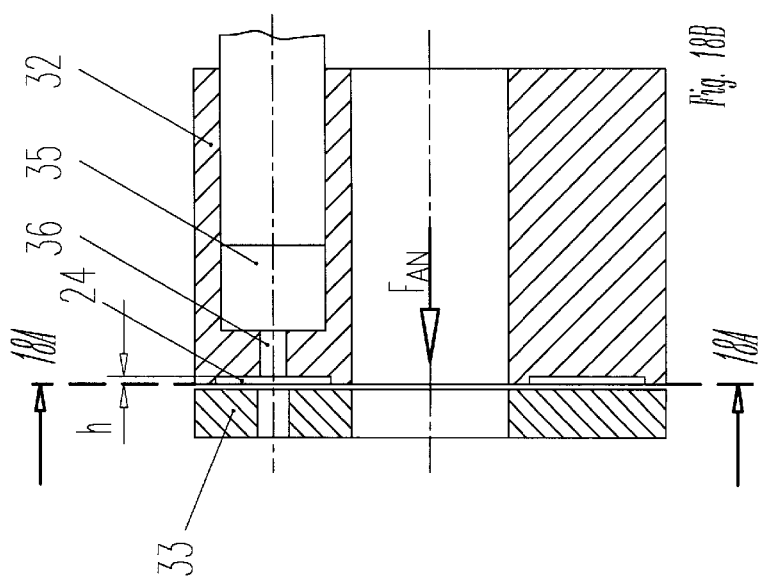

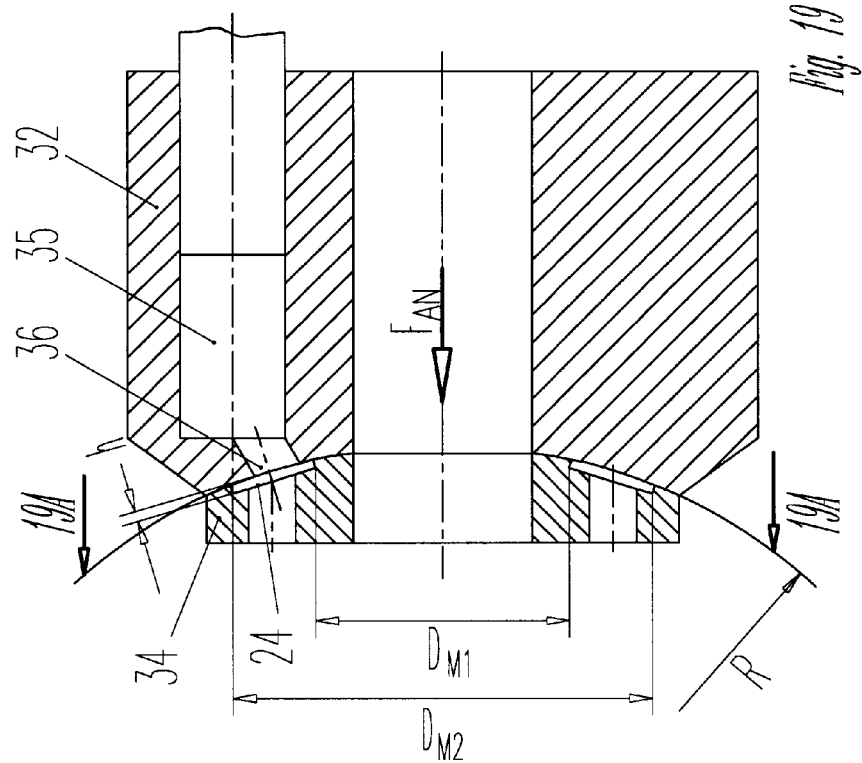
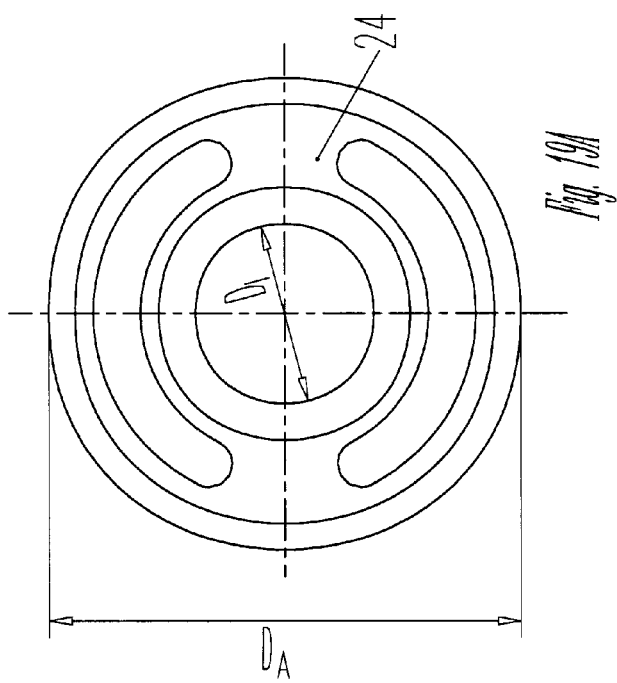

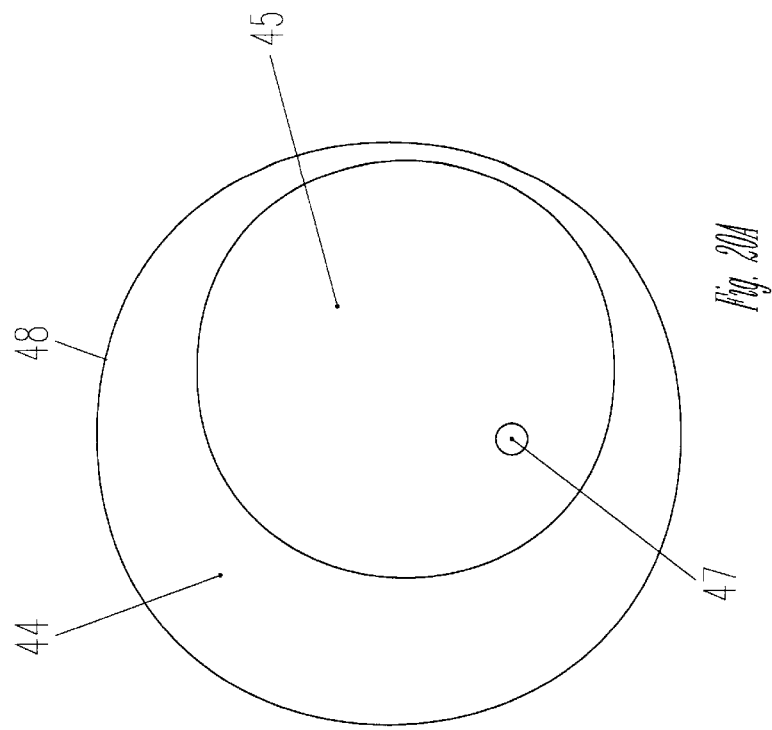
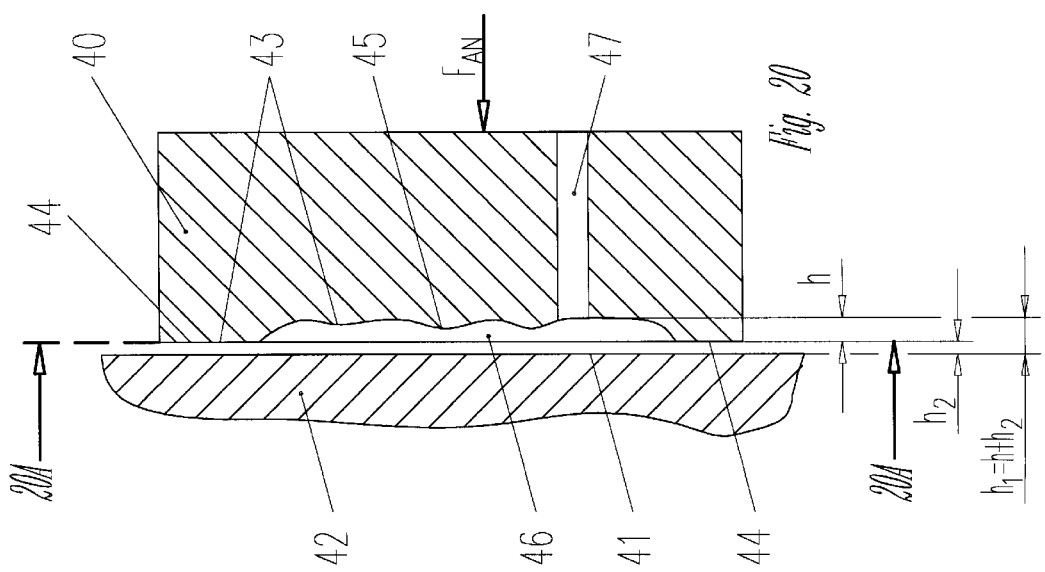

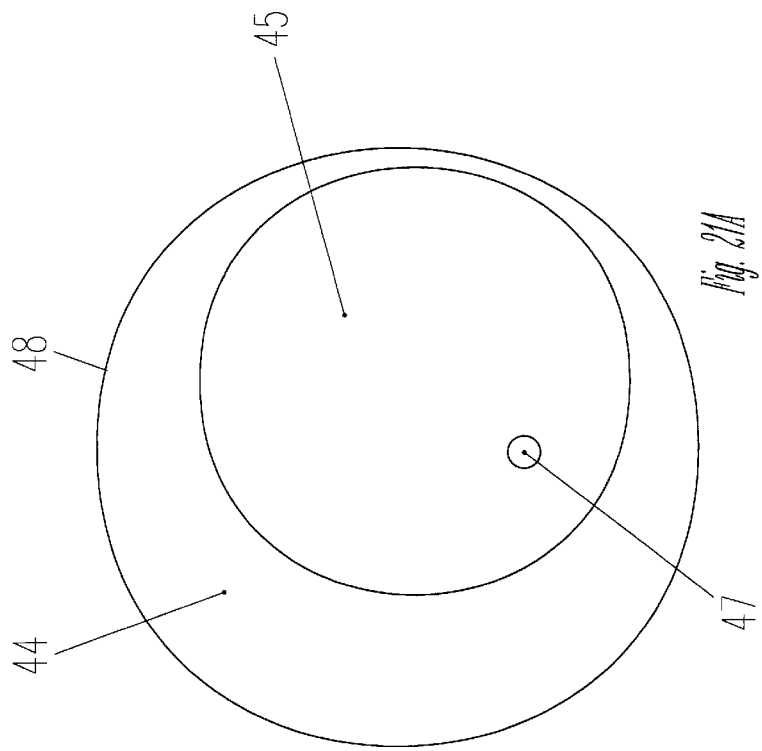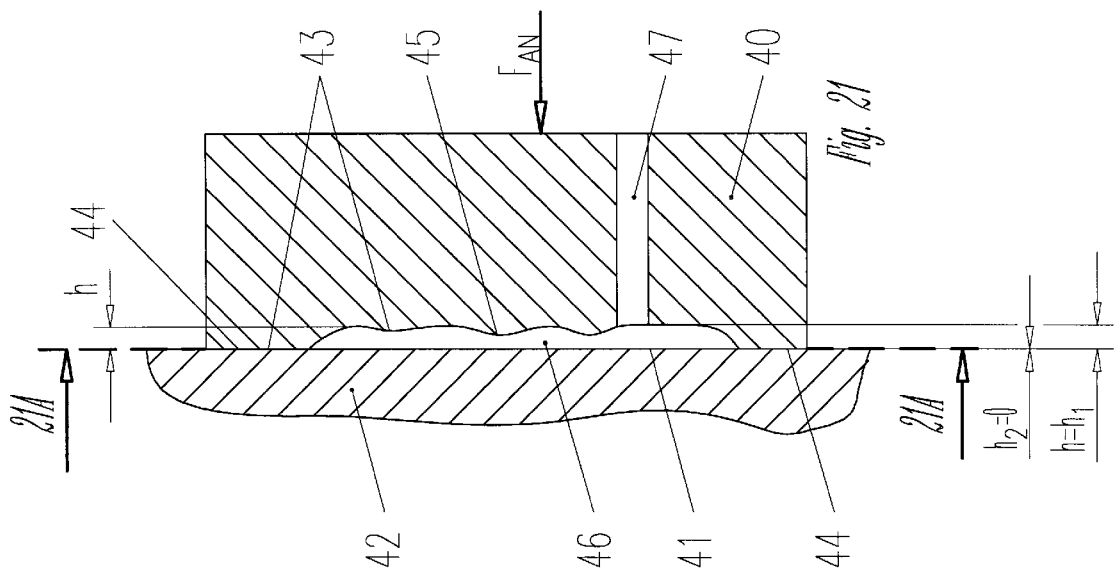

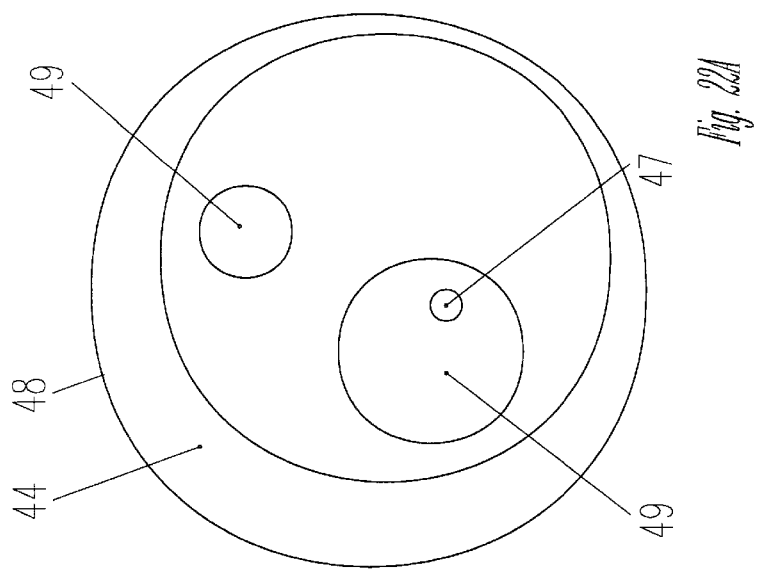
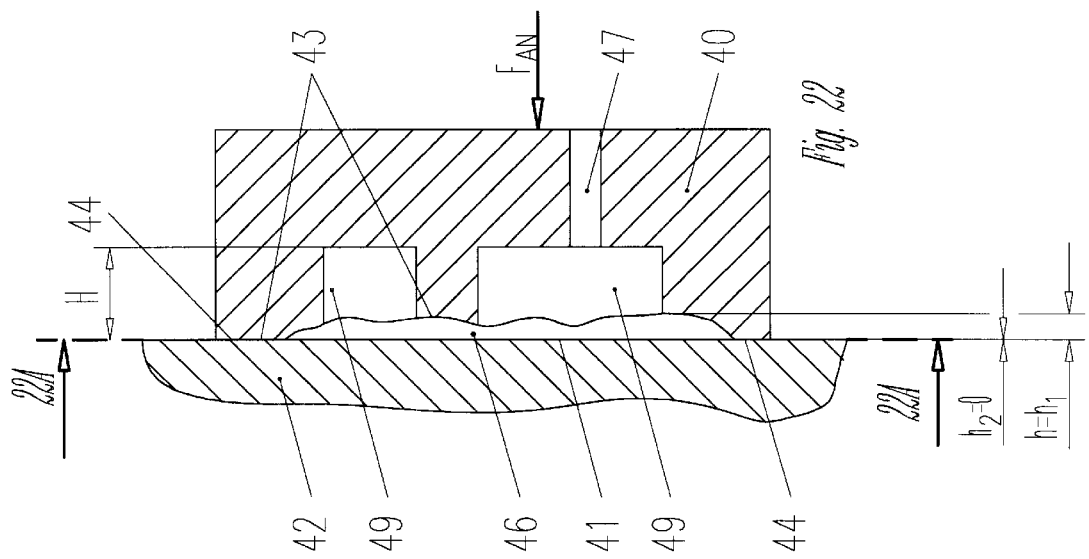

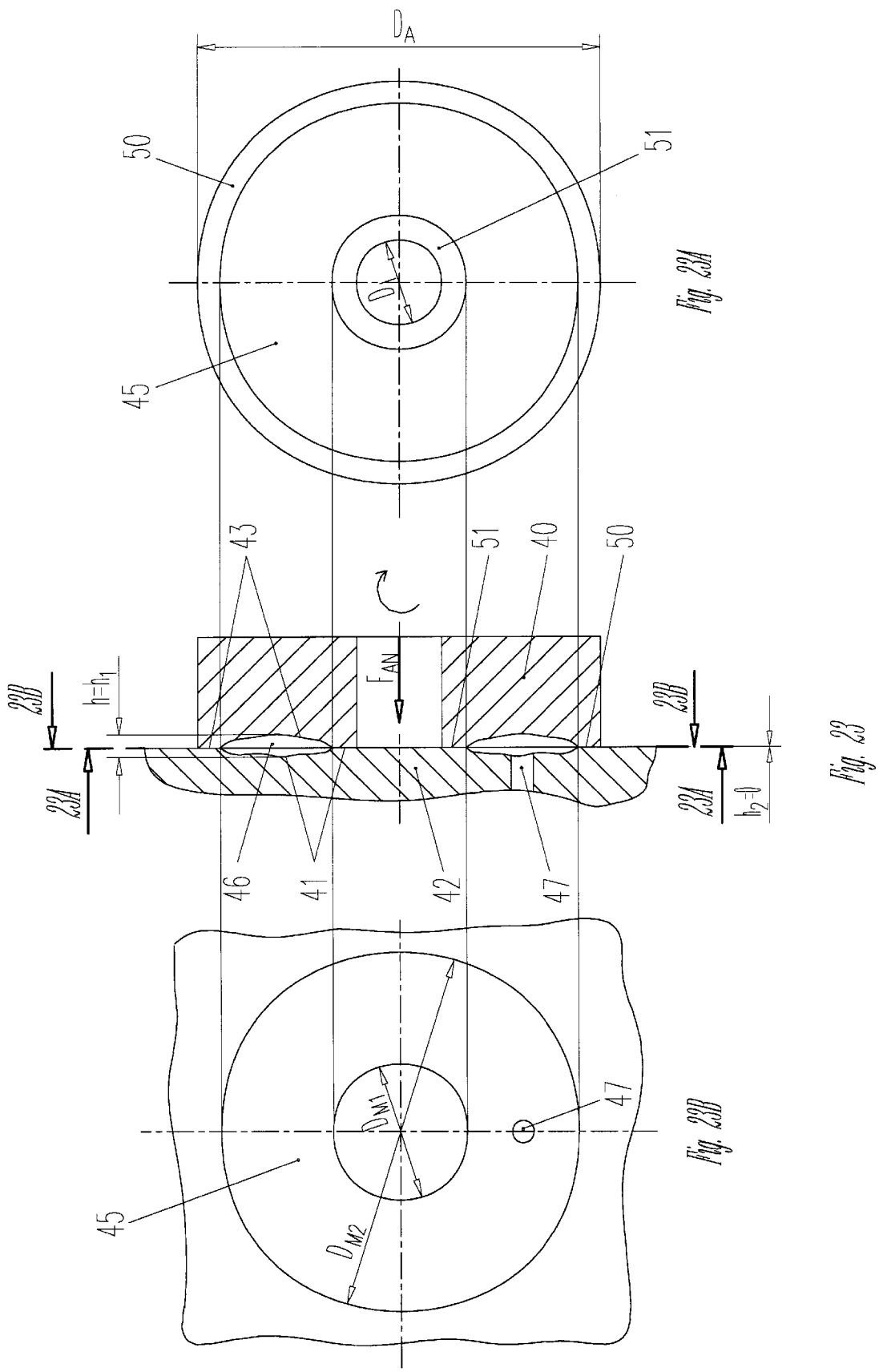

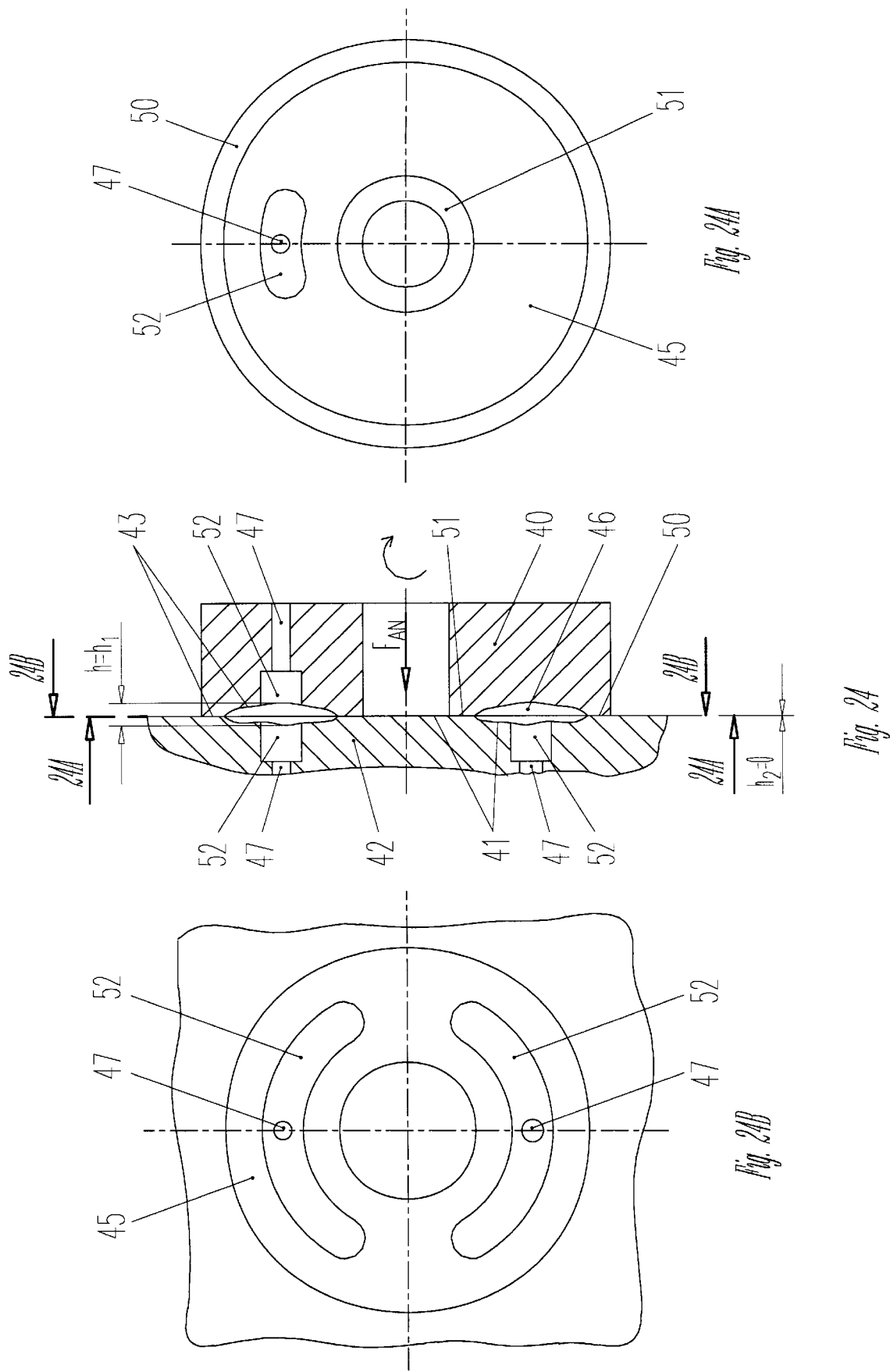

5,983,781

SLIDING BEARING WITH SELF-ADJUSTED LOAD BEARING CAPACITY

BACKGROUND OF THE INVENTION

The invention concerns a hydrostatically balanced sliding bearing as well as hydraulic machines of different design, and general bearing applications with such a sliding bearing. Such sliding bearings are commonly known in various machines, particularly in hydrostatic pumps and motors. Movable and pressure bearing parts are often located in sliding bearings that are hydrostatically balanced through the supply of pressure fluid to the lubricant storing pocket. In axial piston machines with a swash plate design, this affects the slippers, which transfer the entire piston force at a relative movement of the slippers and the swash plate to the swash plate, the rotating cylinder block, the ball joint that connects piston and slipper, which transfers the entire piston force onto slipper. In variable hydrostatic machines the swash plate, that is under load due to the resulting pressure forces of all pistons, can be located in a hydrostatically balanced bearing. Axial piston units with bent axis design additionally have this possibility through axial location of the shaft with a driving flange that is under load due to the pressure forces transferred by the pistons. Similar sliding bearings can also be found in other hydrostatic machines, for example, in radial piston machines, gear pumps and motors, screw machines.

The disadvantages and problems of using hydrostatic bearings are numerous.

Hydrostatically balanced sliding bearings for optimum function need the pressurized fluids, which in hydrostatic machines, is usually taken from the high pressure line or the high pressure chambers of the machine. The pressure fluid that flows through these bearings to the low pressure side can no longer be used for energy transformation. Therefore, this flow has to be considered as a volumetric loss.

To reduce the loss and increase bearing hydrostatic stiffness, orifices are built into the intake channels to the areas under pressure. The orifice cross section in regular machines must be extremely small in order to achieve an appreciable bearing hydrostatic stiffness and in order to keep the volumetric loss within reasonable limits. The necessary small cross sections are very expensive. In some cases they cannot even be built. A capillary intended to serve as an orifice would have to be very long, in most cases greater than the length that is available in the machine. In addition, hydrostatic machines have certain places where orifices cannot be located, for example, the location of the cylinder block on the valve plate.

In order to keep the volumetric losses within reasonable limits, the pocket containing the lubricant currently has to be laid out so that the entire load is not hydrostatically compensated. Due to the excess remaining forces, the relatively moving parts are pressed together, ensuring a sufficient seal. The remaining force at standstill and at low relative speeds is transferred through the direct contact of the solid parts. The result is a boundary lubrication condition between the relatively moving parts due to the non-compensated excess force, which causes major frictional forces and wear. At higher speeds the excess force is usually almost completely compensated by the additional pressure field in the gap as a result of the hydrodynamic effect. The bearing operates as a hydrostatically balanced, hydrodynamic sliding bearing.

The circumstances described above are also described in detail by the example of a hydrostatic bearing that serves to transfer the piston forces to the swash plate in axial piston units with swash plate design. It is commonly known as a slipper and is well known as such in the art. The slipper principally represents a single surface axial bearing.

SUMMARY OF THE INVENTION

A sliding bearing, particularly for slippers of hydrostatic piston machines, with a support having a supporting surface on which slides a sliding piece having a sliding and sealing surface. Between the supporting surface and the sealing part of the sliding and sealing surface is a bearing gap height ($h_2$) and in the sliding and sealing surface at least one shallow recess with a depth (h) bordered by the sealing part of the sliding and sealing surface. At least one connecting channel is connected to a pressure source of the lubricating fluid so that a lubrication gap with a height ($h_2$+h) is formed. The lubrication gap is in accordance with the invention designed in such a way that a self-adjusting load bearing capacity dependent on the gap height ($h_2$) is achieved, whereby in the gap such a flow is created, under the influence of which the velocity of the lubricating fluid is positive (greater than zero) in all directions and the pressure gradient is declining in the flow direction.

BRIEF DESCRIPTION OF THE DRAWINGS

FIG. 1 is a piston with slipper of the common, widely used design;

FIG. 1A is a plan view of the slipper face taken along line 1A—1A in FIG. 1.

FIG. 2 is an enlarged part of the slipper in the area of the sliding and sealing surface of the common slipper according to FIG. 1 with a schematically represented pressure field below the slipper at a bearing gap height $h_2>0$ to explain the function;

FIG. 4 is a slipper with an orifice strip according to patent DE 20 42 106;

FIG. 4A is a plan view of the slipper face taken along line 4A—4A in FIG. 4.

FIG. 5 is a slipper 3 with a hydrostatic bearing according to the invention showing an even supporting surface 4 where the inner slipper diameter $D_1$ equals the diameter d of the inlet opening 10;

FIG. 8 is the outline of the bearing or slipper balance B and the volumetric losses Q dependent upon the bearing gap height $h_2$ for a common slipper and for a slipper with hydrostatic bearing according to the invention;

FIG. 9 is a slipper 3 with a hydrostatic bearing according to the invention for an even supporting surface 4 with a lubrication pocket 8;

FIG. 9A is a plan view of the slipper face taken along line 9A—9A in FIG. 9.

3

Figure 3:
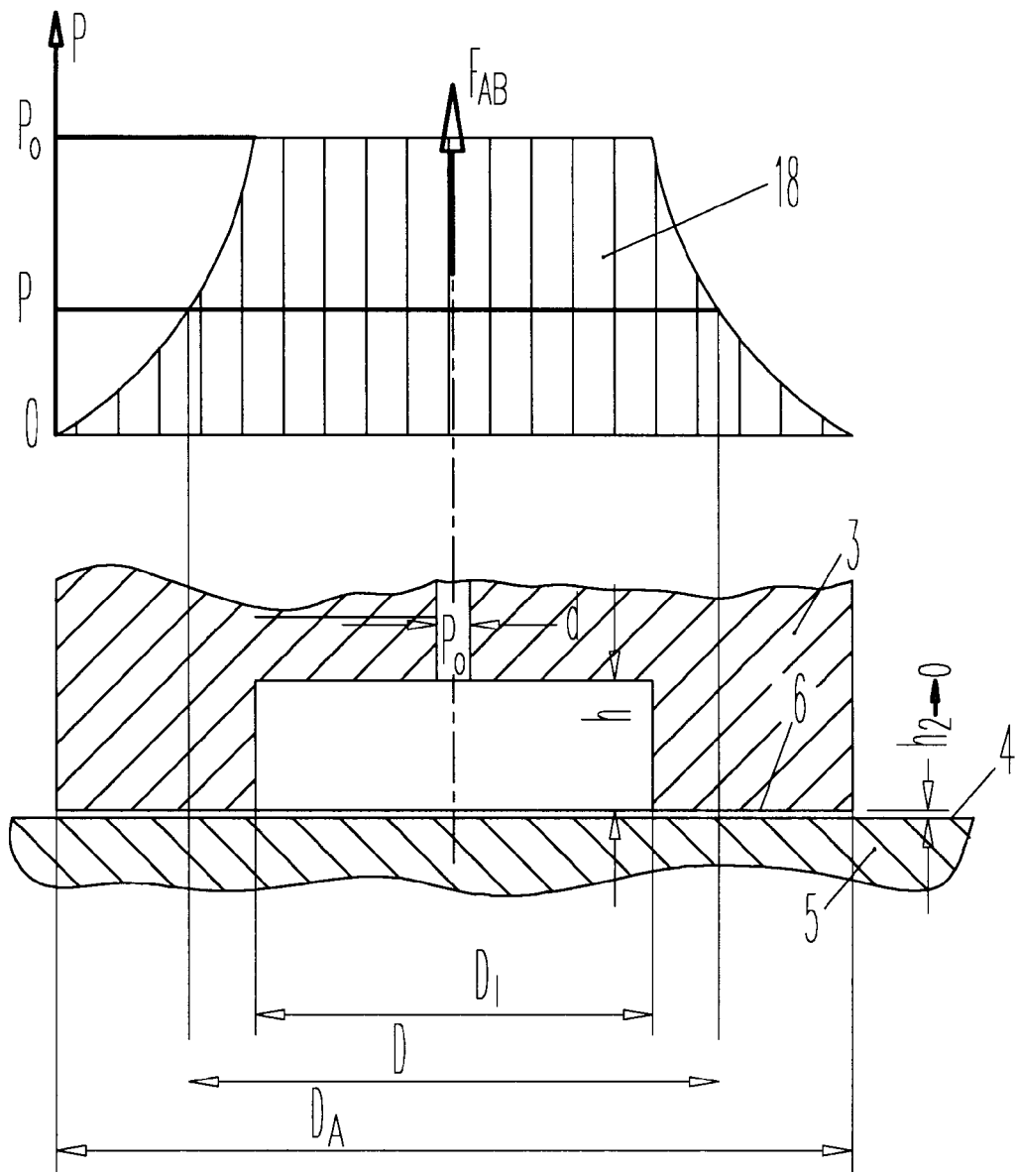
FIG. 3 is an enlarged part of the slipper in the area of the sliding and sealing surface of the common slipper according to FIG. 1 with a schematically represented pressure field below the slipper at a bearing gap height $h_2 \to 0$ or $h_2=0$ to explain function.

FIG. 10 is a slipper 3 with a hydrostatic bearing according to the invention with a lubrication pocket 8 for a supporting surface 4 designed as the outer surface of a cylinder;

FIG. 10A is a plan view of the slipper face taken along line 10A—10A in FIG. 10.

FIG. 11 is a slipper 3 with a hydrostatic bearing according to the invention for a supporting surface 4 designed as the inner surface of a hollow cylinder, where the inner slipper diameter $D_1$ is equal to the diameter d of the inlet opening 10;

FIG. 11A is a plan view of the slipper face taken along line 11A—11A in FIG. 11.

FIG. 12 is an example of a slipper 3 with a hydrostatic bearing according to the invention for a supporting surface 4 designed as the inner surface of a hollow cylinder, where the sealing surface 17 of the slipper 3 is designed as a rectangle with rounded edges;

FIG. 12A is a plan view of the slipper face taken along line 12A—12A in FIG. 12.

FIG. 13 is a piston 1 with a slipper 3 with a hydrostatic bearing according to the invention for an even supporting surface 4 where the ball joint 2 is designed so that the ball is a part of the slipper 3 and the socket is a part of the piston 1;

FIG. 13 is a plan view of the slipper face taken along line 13A—13A in FIG. 13.

Figure 14:
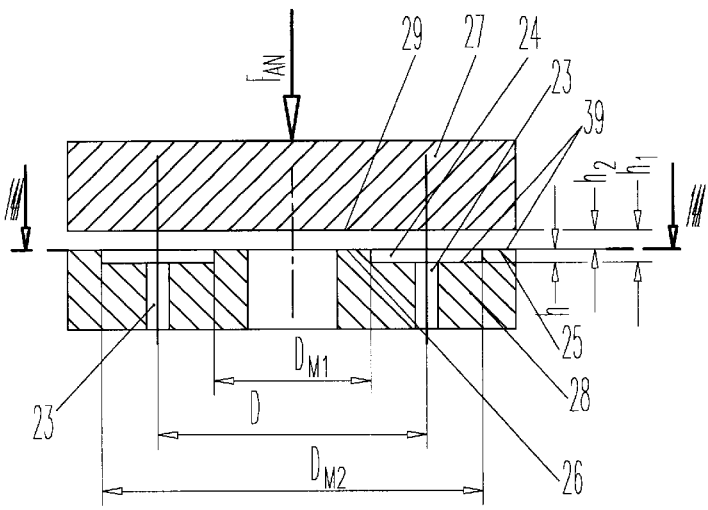
Figure 14A:
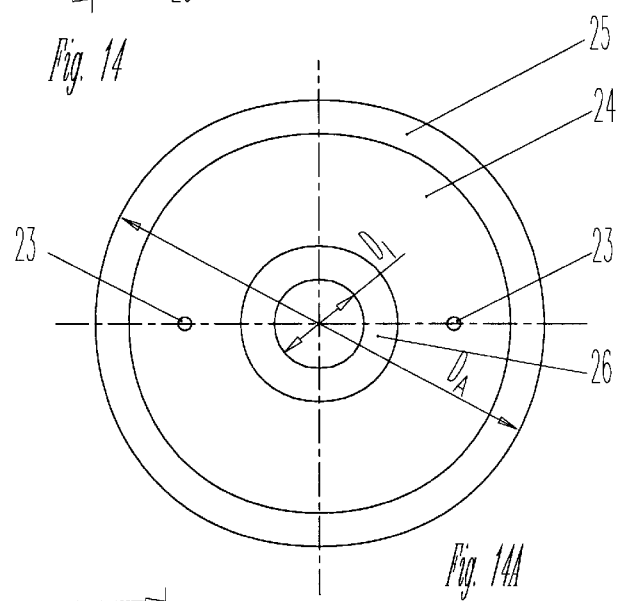

FIG. 14 is a hydrostatically balanced ring chamber bearing with a bearing geometry according to the invention;

FIG. 14A is a plan view of the slipper face taken along line 14A—14A in FIG. 14.

Figure 15:
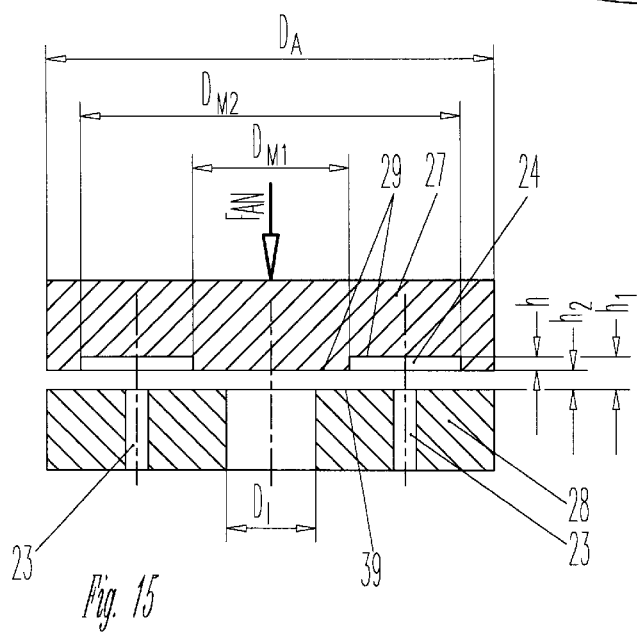
Figure 16:
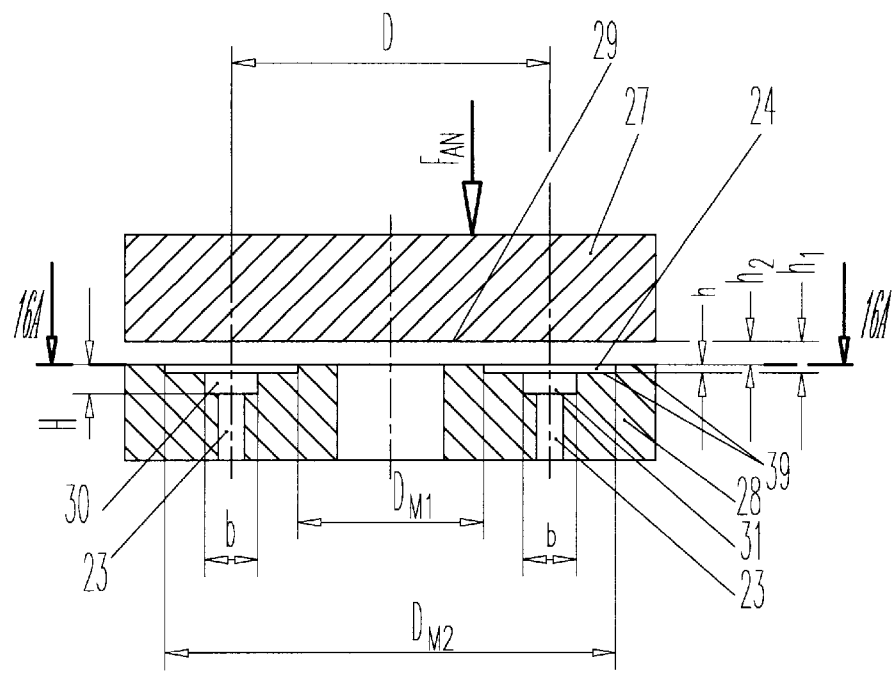
Figure 16A:
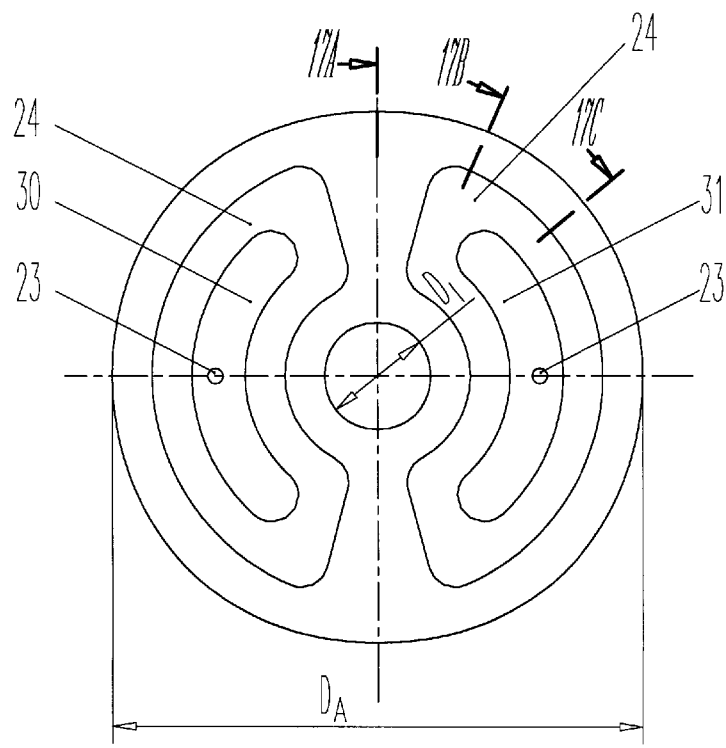

FIG. 15 is a hydrostatically balanced ring chamber bearing with a bearing geometry according to the invention, where the recesses 24 according to the invention are arranged on the supporting surface 29 of the counter piece 27;

FIG. 16 is a hydrostatically balanced ring chamber bearing which is designed as a multiple surface axial bearing with a bearing geometry according to the invention;

FIG. 16A is a plan view of the slipper face taken along line 16A—16A in FIG. 16.

FIGS. 17A, 17B, 17C are enlarged partial sectional views 17A, 17B, and 17C respectively of the bearing shown in FIG. 16A;

FIG. 18A is a plan view of the bearing surface of a cylinder block taken along line 18A—18A in FIG. 10B;

FIG. 18B is a sectional view taken along line 18B—18B in FIG. 18A of the cylinder block 32 on an even valve plate 33 in a hydrostatic axial piston machine illustrating the application of the hydrostatically balanced ring chamber bearing with a bearing geometry sccording to thr invention;

FIG. 20 shows a generalized hydrostatically balanced single surface axial bearing with a bearing geometry according to the invention;

FIG. 20A is a plan view of the bearing taken along line 20A—20A in FIG. 20.

FIG. 21 shows a generalized hydrostatically balanced single surface axial bearing with a bearing geometry according to the invention, drawn at the contact of the sliding piece 40 on the support 42, i.e., at $h_2=0$;

FIG. 21A is a plan view of the sliding piece 40 taken along line 21A—21A in FIG. 21.

FIG. 22 shows a generalized hydrostatically balanced single surface axial bearing with a bearing geometry according to the invention and with lubrication pockets 49, drawn at the contact of the sliding piece 40 on the support 42, i.e., at $h_2=0$;

FIG. 22A is a plan view of the sliding piece 40 taken along line 22A—22A in FIG. 22.

FIG. 23 shows a generalized hydrostatically balanced ring chamber bearing that is designed as a single surface axial bearing with a bearing geometry according to the invention, drawn at the contact of the sliding piece 40 on the support 42, i.e., at $h_2=0$;

FIG. 23A is a plan view of the sliding piece 40 taken along line 23A—23A in FIG. 23;

FIG. 23B is a plan view of the support 42 taken along line 23B—23B in FIG. 23;

FIG. 24 shows a generalized hydrostatically balanced ring chamber bearing that is designed as a multiple surface axial bearing with a bearing geometry according to the invention, drawn at the contact of the sliding piece 40 on the support 42, i.e., at $h_2=0$;

FIG. 24A is a plan view of the sliding piece 40 taken along line 24A—24A in FIG. 24.

FIG. 24B is a plan view of the support 42 taken along line 24B—24B in FIG. 24;

DESCRIPTION OF THE PREFERRED EMBODIMENT

The piston 1, which is supported on a supporting surface 4 of the acting support counter piece 5, which causes the displacement via a slipper 3 attached by means of a ball joint 2, creates a back and forth motion in the cylinder 11. From the cylinder pressure chamber 12 the pressure fluid is transported to the slipper 3 to the lubrication pocket 8 through connecting channels 7 in the piston 1 and 9 in the slipper 3. The lubrication pocket 8 usually has a depth h from a few tenths of a millimeter to several millimeters. Under these conditions there is equal pressure $p_O$ in the lubrication pocket 8, as illustrated in the upper part of FIG. 2, since the pressure drop between inlet opening 10 and the diameter $D_1$ at such depth h is negligibly small. The lubrication pocket 8 can have any shape, for example flat, as illustrated in FIG. 1 or conical recess.

The supporting surface 4 of the counter part or the support 5 as well as the sliding and sealing surface 6 of the sliding piece or the slipper 3 are commonly designed and manufactured as closely as possible parallel to one another.

Based upon the assumption that the support surface 4 and the sliding and sealing surface 6 are parallel and the flow between these surfaces has laminar characteristics, the pressure route under the sliding and sealing surface 6, i.e. between the cross sections $D_1$ and $D_A$ can be described mathematically and the slipper separating force $F_{AB}$ can be calculated as the supporting force of the pressure field under the slipper.

Given the above conditions, the slipper separating force $F_{AB}$ and therefore also the slipper balance B, which is defined as the ratio of the separating $F_{AB}$ and the slipper clamping force $F_{AN}$ (B =$F_{AB}/F_{AN}$), are independent of the slipper gap height $h_2$ since the pressure field under the slipper does not change along with the slipper gap height $h_2$. Also, the pressure field under the slipper even stays unchanged at $h_2 \rightarrow 0$, as illustrated in FIG. 3. Contrary to this the volumetric losses under the slipper rise to the third power of the gap height $h_2$.

The lubrication pocket 8 and the bearing and slipper dimensions, i.e. $D_A$ and $D_1$ in FIGS. 1 and 2, in common applications are selected in such a way that the slipper separating force $F_{AB}$, created by the pressure field in pocket 8 and the pressure field between the sliding and sealing surface 6, is somewhat lower than the clamping force $F_{AN}$, exerted upon the slipper, i.e., the slipper balance B<1. The remaining force during standstill and low relative speeds between the slipper 3 and supporting surface 4 will then be transferred through the direct contact of the slipper 3 and the counter part 5. At higher speeds the excess force is compensated by the additional pressure field in the gap between sliding and sealing surface 6 of the slipper 3 and the supporting surface 4 as a result of the hydrodynamic effect.

At low relative speeds, i.e., during start up and at low rotational speed, the slipper 3 is pushed onto the supporting surface 4 with the remaining force. At low relative movement between slipper 3 and supporting surface 4, a relatively great friction force is created between these parts. Therefore, the hydraulical-mechanical efficiency and the start-up efficiency is accordingly low. If the slipper were designed in such a way that the slipper separating force $F_{AB}$ was exactly equal to or greater than the slipper clamping force $F_{AN}$, the friction between slipper 3 and supporting surface 4 would be lower, but great flow losses would occur under the slipper due to the slipper lift-off.

Several measures can be taken to increase the bearing stiffness and to reduce flow volume losses during the lift-off the slipper. Various orifice locations are designed in the inflow channels. See for example, capillaries in piston 1 or jet 13 in piston 1 or jet 14 in slipper 3 or jets simultaneously at both locations as shown in FIGS. 1 and 1A These measures have one disadvantage. In that functioning orifices require very small cross sections. The calculations show that for common hydrostatic machines the diameter of the bores have to be smaller than 0.2 mm. The construction of such bores is very complicated and expensive. In addition, there is the very real risk that the bore gets plugged by dirt particles, which strongly affects the function of the slipper and, therefore, the function of the entire machine.

Another solution of the problem is suggested by patent DE 20 42 106, as shown in FIG. 4. In the lubrication pocket 8 of the slipper 3 there is at least one so-called orifice strip 15 between the inlet opening and the outer sealing strip 6 intended to reduce the flow volume under the slipper. However, the flow cross section under the orifice strip 15 has to be very small for a functioning orifice strip, about 0.00077 $cm^2$, as indicated in the patent mentioned. This means that for common design the distance between the orifice strip 15 and the supporting surface 4 has to be less than 0.001 mm. High volume production of such a slipper would cause many problems.

The problems and disadvantages described occur with all sliding bearings and which are not completely balanced.

This invention, therefore, provides a hydrostatically balanced bearing which is characterized by low friction and low volumetric losses over the entire range of relative speeds of the moving parts, i.e., from standstill to maximum speed, and can be produced without great expense. The aforesaid problems have been solved by using a hydrostatically balanced sliding bearing as described herein.

Correspondingly, the sliding bearing in accordance with the invention, which is particularly used as a slipper in hydrostatic piston machines, exhibits a support with a supporting surface, on which a movable sliding part, having a sliding and sealing surface, is supported. Between the supporting surface and the sealing section of the sliding and sealing surface is a bearing gap height $h_2$, or referred to in hydrostatic piston machines as slipper gap height. On the sliding and sealing surface is at least one shallow recess with the depth h, which is bordered through the sealing section of the sliding and sealing surface. The recess is hydraulically connected through at least one connecting channel with the pressure lubrication fluid source, so that a lubrication gap height $h+h_2$ is created. In accordance with the invention the lubrication gap is designed in such a way, that a self-adjusted load bearing capacity dependent on the bearing gap height $h_2$ is achieved. In the lubrication gap a flow is generated such, that the lubrication fluid velocity is positive (greater than zero) in all directions and the pressure gradient is declining in the flow direction.

Such a slipper, with a self-adjusted load bearing capacity dependent on bearing gap height $h_2$, has a high stiffness even without orifices in the lubrication fluid inflow lines to the sliding surfaces of the bearing. As a result, better running qualities as well as a lower consumption of the lubrication fluid are simultaneously created, even at low relative speeds between movable sliding parts.

An essential advantage of a hydrostatically balanced sliding bearing according to the invention, without orifices in the lubrication fluid inflow lines to the sliding surfaces or to the recess or to the lubrication pockets, is that such a bearing can be utilized in all those locations of machines and equipment where regular bearings are used. In addition, they may be used where rolling bearings are the bearing of preference due to the lower friction during startup and the low consumption of lubricant.

A further essential advantage of the sliding bearing of this invention is that the shaping of the sliding and sealing surfaces can be manufactured. Overexcessive requirements for the surface quality are not necessary. The cost of production of such bearings are distinctly lower than the cost of production of common sliding bearings, which require superfinished sliding surfaces. Since the surface roughness of the bearing surfaces in recesses is of no major importance, it may be possible to manufacture the shallow recesses on smaller bearings by means of etching. Consequently, by utilizing the hydrostatically full balanced sliding bearing of this invention, considerably reduced expenses, dimensions, and material use can be achieved while simultaneously improving the characteristics of the machines.

According to the preferred construction example the depth h of the recess, i.e., of which depth relating to the sliding and sealing surface, is within the range 0 mm up to 0.15 mm. Thus, such a recess is not comparable with the known lubrication pockets which represent the state of technology. The lubrication pocket depths of the prior art exceed considerably the recess depth of this invention. At least one lubrication fluid pocket with the depth H, where H is greater than h, can be placed in the area of the recess. That means that the dimensions of the lubrication pocket depth clearly exceed the depth of the recess. The recess is preferably arranged on the supporting surface of the support. In this case it is advantageous that the supply of the lubrication fluid can be realized on an immovable part of the machine. However, a supply of the lubrication fluid through a moving piston, for example in a hydrostatic piston machine, is also possible and is technically feasible in such a way that the piston is hollow drilled and the lubrication fluid is conducted through the piston to the recess which is located on the sliding and sealing surface of the sliding part.

Also, the recess can be built both into the supporting surface of the support as well as into the sliding and the sealing surface of the sliding part. The recess is preferably created approximately equally on the supporting surface as well as on the sliding and sealing surface, where the width of the both recess parts in the main corresponds to one another. The supporting surface is preferably designed as an even surface. That means that a sliding part with an even surface with the sliding and sealing surface slides on an essentially even supporting surface of the support. Also, the supporting surface can be designed as the outer surface of a cylinder, i.e., the supporting surface is convex.

Similarly, the supporting surface can be designed as the inner surface of a hollow cylinder, i.e., as a concave surface. Further, the supporting surface can be designed as the outer surface of a ball or as the inner surface of a hollow ball. The sealing area of the sliding and sealing surface of the sliding part can be shaped in accordance with the application as a ring, rectangle, oval; however the shape of the sealing area is not limited on the mentioned surface forms. Also, if the width of the sealing part of the sealing and sliding surface is equal to zero, i.e.; when the sliding piece touches the supporting surface, the contact between the sliding piece and the supporting surface is in the shape of a line. Such a contact between the sliding piece and the supporting surface is advantageous, where the smallest bearing dimensions as well as the high-accuracy function with low friction is required. These numerous application possibilities of the hydrostatically fully balanced sliding bearing according to this invention illustrate that that its application possibilities are almost unlimited because of the relatively little demands on the surface creation of the sliding bearing parts.

In summary, preferred applications of the sliding bearings according to invention are: slippers and swash plate in hydrostatic axial piston machines of the swash plate design, slippers in hydrostatic radial piston machines, bearing of the cylinder block on the valve plate in hydrostatic axial piston machines, bearing of the valve plate in hydrostatic radial piston machines, bearing of the swash plate in variable hydrostatic machine of the swash plate design, bearing of the shaft with the driving flange in hydrostatic axial piston machine of the bent axis design, bearing of the valve plate in variable hydrostatic axial piston machine of the bent axis design, and radial and/or axial bearing of a shaft generally.

Figure 6:
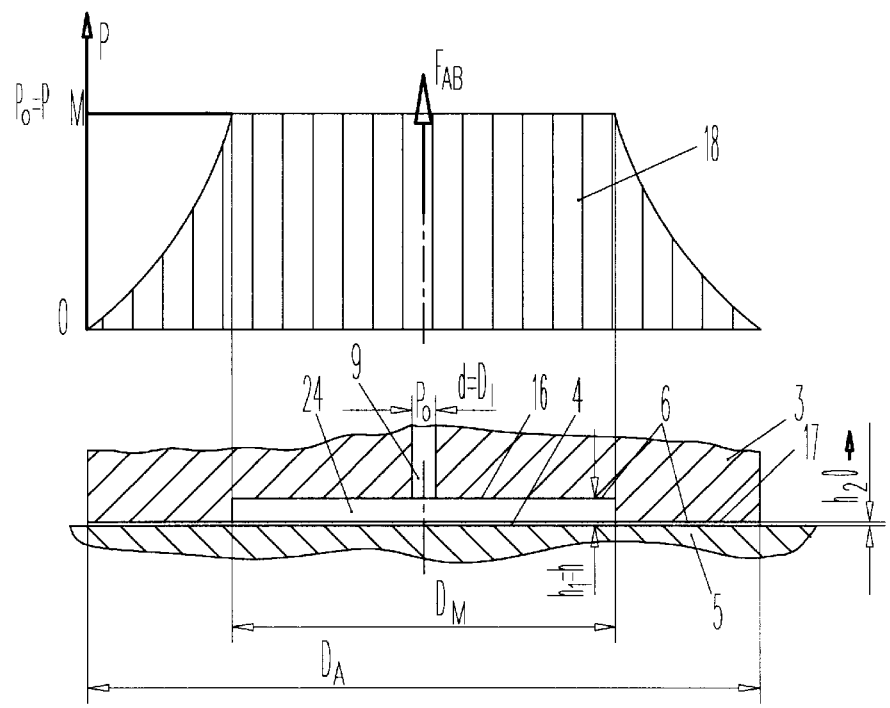
FIG. 6 is an enlarged part of the slipper 3 with a hydrostatic bearing according to the invention showing the sliding and sealing surface 6 according to FIG. 5, with a schematically represented pressure field 18 under the slipper when $h_2 \to 0$.
Figure 7:
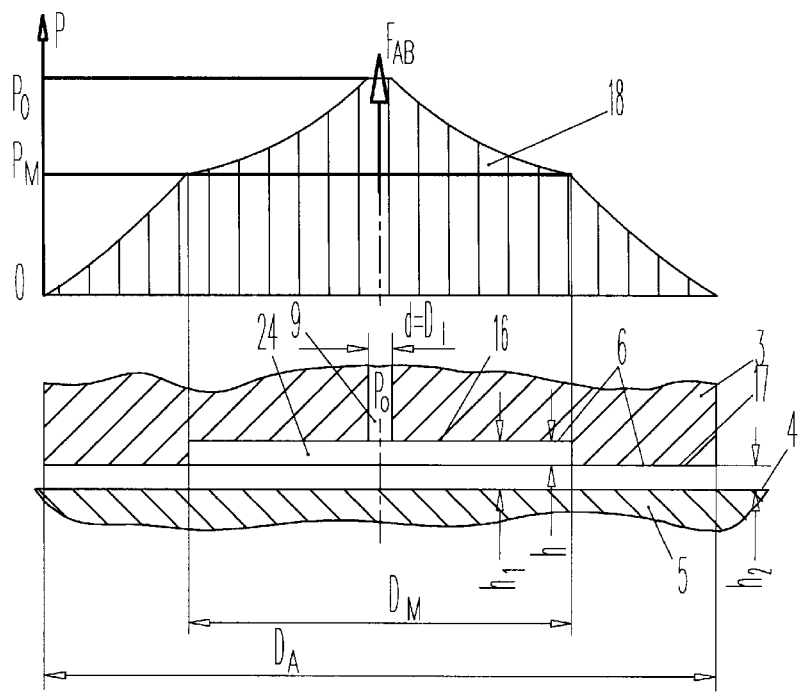
FIG. 7 is an enlarged part of the slipper 3 with a hydrostatic bearing according to the invention showing the sliding and sealing surface 6 according to FIG. 5, with a schematically represented pressure field 18 under the slipper when $h_2>0$.

The function of the slipper according to the invention is explained by using the example of the slipper illustrated in FIG. 5 to FIG. 7 with a simple surface geometry for an even supporting surface 4 that causes piston displacement.

With reference to FIGS. 5–7, the sliding surface 6 of the slipper 3 facing the supporting surface 4 is designed in such a way, that between the inner slipper diameter $D_1$ and the diameter $D_M$, which lies between the inner slipper diameter $D_1$ and the outer slipper diameter $D_A$, a shallow recess with a small depth h has been built. This creates two areas on the sliding surface 6 of the slipper, i.e., area 16 between the diameters $D_1$ and $D_M$ and area 17 between the diameters $D_M$ and $D_A$. In the area 16 a minor gap h is created between the supporting surface 4 and the sliding surface 6, even when the slipper 3 touches the supporting surface 4, i.e., even when in area 17 between the slipper 3 and the supporting surface 4 have no or negligible little gap. During slight lifting-off of the slipper 3 from the supporting surface 4, under the sliding surface 6 between the diameters $D_1$ and $D_A$ a gap is created with a non-constant height. In area 16 between the diameters $D_1$ and $D_M$ the gap height is $h_1$, and in area 17, between the diameters $D_M$ and $D_A$ the gap height is $h_2$, where $h_1=h_2+h$.

When the fluid flows from the inlet opening 10 to the outside, a pressure field is created under the slipper, whose shape is dependent upon the height of the gap $h_2$. At gap height $h_2 \rightarrow 0$, i.e., when the slipper 3 almost touches the supporting surface 4 and only a negligible small amount of fluid can leak, than there is constant pressure $p_O$ under the slipper in the area between the inlet opening 10 and the diameter $D_M$. This pressure is equal to the pressure in the cylinder pressure chamber 12 because when the flow velocity equals zero or is close to zero, no pressure drop between the inlet opening 10 and the diameter $D_M$ takes place. The slipper separating force $F_{AB}$ will be at maximum in this case.

When the slipper 3 lifts off from the supporting surface 4, the operating fluid begins to flow from the inlet opening 10 to the outside and the pressure under the slipper in the area between the diameters $D_1$ and $D_M$ generally decreases. This is because at a small gap height $h_2$, which must be considerably smaller than the depth of the lubrication pocket of a common slipper, during the flow from the inlet opening 10 to the outside between the diameters $D_1$ and $D_M$, there is not a negligible drop in pressure. A pressure field 18 builds up under the slipper, as shown qualitatively in the upper half of FIG. 7. The area of the pressure field 18 in FIG. 7 is considerably smaller than the area of the pressure field 18 in FIG. 6 which shows the pressure field when the gap height $h_2$ is close to zero. Consequently, the slipper separating force $F_{AB}$ is also less in this case. The higher the gap height $h_2$ under the sliding surface 17, the lower the slipper separating force $F_{AB}$. The slipper separating force $F_{AB}$ is, therefore, indirectly proportional to the gap height $h_2$ under the sliding surface 17.

The qualitative comparison of the slipper balance B dependent on the gap height $h_2$ is shown in FIG. 8. The heavily dotted line 19 shows the course of the slipper balance for common slippers. The connected line 20 shows the course of the slipper balance for the slipper. It is evident that the slipper is by far more stable than a common slipper, since there is a marked relationship between gap height $h_2$ and balance B. When a random disturbance occurs that increases the height of the gap $h_2$, the balance decreases, i.e., the slipper separating force $F_{AB}$ becomes smaller than the slipper clamping force $F_{AN}$. Due to the discrepancy in forces $F_{An}-F_{AB}$ the slipper is pressed onto the supporting surface until the balance is regained. If the slipper is pressed toward the supporting surface for any reason, the gap becomes smaller and the slipper balance B becomes greater, i.e., the slipper separating force $F_{AB}$ becomes greater than the slipper clamping force $F_{AN}$. The slipper is lifted off the supporting surface until the forces are again in balance. During normal operation there will always be an exactly defined state of balance.

It can be proven mathematically that the flow volume under balanced conditions for the slipper according to the invention is smaller in general than the flow volume under common slipper. The dependency of the flow volume under the slipper, i.e., of the volumetric losses, upon the gap height $h_2$ is also shown in FIG. 8. The thinly dotted line 21 applies to common slippers and the line 22 applies to slipper according to the invention.

The function described for the slipper can only be guaranteed if the slipper gaps heights $h_1$ and $h_2$ are comparable, i.e., the depth of recess h in FIGS. 5 to 7 is very small, comparable to the slipper gap height $h_2$. For practical application this means that the depth of recess h has to be less than 0.15 mm. Whether the depth h is constant or not is of no significance in this regard.

The slipper with a bearing geometry can be laid out in such a way that the slipper separating force or load bearing capacity $F_{AB}$ during standstill and low rotational speeds is equal to the slipper clamping force $F_{AN}$ and the flow volume losses under the slipper are low nevertheless. The slipper gap height $h_2$ must be selected so that the sum of the friction losses and the volumetric losses is minimal at the desired operating parameters.

For some applications it is advantageous to design the slipper 3 with a bearing geometry according to the invention with a lubrication pocket 8 In this case the inner slipper diameter $D_1$ is greater than the diameter d of the inlet opening 10 as shown in FIGS. 9 and 9A.

As previously indicated, it is advantageous for the supporting surfaces of different shapes. FIGS. 10 and 10A show an example of an application with a supporting surface 4 that has been designed as the outer surface of a cylinder, as for example in radial piston machines with inner piston support or for radial sliding bearings. FIGS. 11 and 11 A show an application with a supporting surface 4 which is, similar to a radial piston machine with outer piston support, the inner surface of a hollow cylinder.

The principle of this invention allows such bearing designs where the bearing sealing surface, i.e., the area 17 of the sliding and sealing surface 6 of the slipper 3 is not shaped as a circular area. Other possible shapes of sealing surface 17 are rectangle, oval, etc. FIGS. 12 and 12A show an example of such a design where the sealing surface 17 is designed as a rectangle with rounded edges.

The principle of the invention may also be applied to other kinds of hydrostatically balanced bearings. FIG. 14 shows an example of a ring chamber bearing with a bearing geometry according to the invention. The pressure fluid is routed through one or more inflow lines 23 into very shallow ring-shaped recess 24. The height h of the recess 24 must be comparable to the bearing gap height $h_2$. The recess 24 is bordered by the outer sealing surface 25 and the inner sealing surface 26. When the sliding piece 27 touches the supporting surface 29 of the support 28, the result is a negligible bearing gap height $h_2 \rightarrow 0$ between the sealing surfaces 25 and 26 and the supporting surface 29. The pressure field in the gap between the supporting surface and the bearing surface facing the supporting surface will then become dependent on the bearing gap $h_2$ similar to the slipper (see FIGS. 6 and 7). The bearing balance and the flow volume in the bearing gap will run qualitatively similar as shown in FIG. 8 for the slipper.

The recess 24 has been designed for the function of the bearing regardless of its position. In FIG. 15 a hydrostatically balanced ring chamber bearing with a bearing geometry according to the invention is shown, where the recess 24 is arranged on the supporting surface 29 of the counter piece 27. This practice, however, is only possible when the relative movement of the parts 27 and 28 is rotation along the vertical axis. A rotation of both parts in the opposite direction is feasible.

The above mentioned hydrostatically balanced bearing may also be designed with one or more optionally shaped lubrication pocket. The height H of these pockets must be designed being much greater than the depth h of the recess 24. FIG. 16 shows an example of a multiple surface axial bearing with bearing geometry according to the invention with two additional pockets 30 and 31. Such lubrication pockets may be arranged at any desired location within the recess 24. There is almost constant pressure in these pockets due to the great height. Therefore it is possible to influence the load bearing capacity of the bearing and the location of the point of application of the bearing capacity $F_{AB}$ by variation of the size and the position of the pockets. The pocket 30 can take low pressure and the pocket 31 high pressure. Bearings designed in such a manner are predominantly suited for the bearing of eccentrically loaded parts.

The shallow recess 24 can be designed as ring-shaped, as shown in FIGS. 14 and 14A or any other way, for example, separated from one another as shown in FIGS. 16 and 16A. FIGS. 17A, 17B and 17C show the enlarged cross sections 17A, 17B and 17C respectively of the bearing in FIGS. 16 and 16A.

FIGS. 18 and 18A show a practical application of a hydrostatically balanced ring chamber bearing. It shows the bearing of the cylinder block 32 on a even valve plate 33 in an axial piston machine. The rotating cylinder block is pushed toward the motionless valve plate 33 due to the pressure forces produced in the cylinders 35. The recess 24 is shown built onto cylinder block 32.

FIGS. 19 and 19A show the bearing of a cylinder block 32 on a spherical valve plate 34 in an axial piston machine. The bearing geometry is achieved by means of the recess 24 on the valve plate 34 having a spherical radius R.

FIGS. 20 and 20A show a generalized hydrostatically balanced single surface axial bearing with a bearing geometry wherein the recess 46 has an irregular surface. This irregularity of the inner surface is allowed as long as the depth h of the recess is in defined range, i.e., it is so small, that the above described flow in the bearing gap is generated.

FIGS. 21 and 21A show a generalized hydrostatically balanced single surface bearing with a bearing geometry which is shown in the FIG. 20, drawn at the contact of the sliding piece 40 on the support 42, i.e., $h_2=0$.

FIGS. 22 and 22A show a generalized hydrostatically balanced single surface axial bearing with a bearing geometry similar to the bearing shown in FIG. 20. This single surface bearing, in the distinction to the application example drawn in FIG. 20, has the lubrication pockets 49, where the lubrication fluid is connected through a connecting channel 47 directly with at least one lubrication pocket. The other lubrication pocket is connected indirectly through the recess 46 with the connecting channel. FIG. 22 is drawn at the contact of the sliding piece 40 on the support 42, i.e., $h_2=0$.

In FIG. 23 is a generalized hydrostatically balanced ring chamber bearing that is designed as a single surface axial bearing with a bearing geometry according to the invention, drawn at the contact of the sliding piece 40 on the support 42, i.e., $h_2=0$. FIG. 23B corresponds to the viewing direction from the right side i.e., on the support with the connecting channel 47 to the recess 46. FIG. 23A is the view to the right side, i.e., top view on the sliding and sealing surface of the sliding piece.

FIGS. 24 and 24A and 24B show a generalized hydrostatically balanced ring chamber bearing that is designed as a multiple surface axial bearing with a bearing geometry drawn at the contact of the sliding piece 40 on the support 42, i.e., $h_2=0$. The design of this multiple surface axial bearing is in principle similar to the single surface axial bearing. In the drawn multiple surface axial bearing, lubrication pockets are built in the support 42 and in the sliding piece 40, where lubrication pockets 52 are connected with the lubricant source through connecting channels 47 in the sliding piece 40 and in the support 42. The sealing areas of the sliding and sealing surface 43 are designed as circular areas 50 and 51. Between these sealing areas is located recess 46 designed as a ring area.

It is therefore seen that this invention will achieve at least its stated objectives.

What is claimed is:

1. A sliding bearing for slippers of a hydrostatic piston machine, comprising, said bearing having a support (5, 28, 42) and a supporting surface (4, 39, 41), a sliding piece (3, 27, 40) having sliding and sealing surfaces (6, 29, 43) which slidably engage said support, a gap located between the support and the sealing surface and having a gap height ($h_2$), a shallow recess (24, 26) in said sealing surface having a depth (h) in the range of approximately 0 to 0.15 mm., said recess being hydraulically connected by a connecting channel (9, 23, 27) to a source of lubrication fluid, and a lubrication gap being defined by said gap height ($h_2$) and the depth (h) of said recess.

2. The sliding bearing according to claim 1 wherein at least one lubrication pocket (8, 30, 31, 49, 52) of height (H) exists within the recess (24, 46), where (H) is considerably greater than (h).

3. The sliding bearing according to claim 1 wherein the recess (24, 46) is built into the supporting surface (4, 39, 41).

4. The sliding bearing according to claim 1 wherein the recess (24, 46) is built both into the sliding and sealing surface (6, 29, 43) as well as in the supporting surface (4, 39, 41).

5. The sliding bearing according to claim 1 wherein the supporting surface (4, 39, 41) is an even surface.

6. The sliding bearing according to claim 1 wherein the supporting surface (4, 39, 41) is the outer surface of a cylinder.

7. The sliding bearing according to claim 1 wherein the supporting surface (4, 39, 41) is a hollow cylinder.

8. The sliding bearing according to claim 1 wherein the supporting surface (4, 39, 41) is the outer surface of a ball.

9. The sliding bearing according to claim 1 wherein the supporting surface (4, 39, 41) is the inner surface of a hollow ball.

10. The sliding bearing according to claim 1 wherein the sealing part (17, 25, 26, 44, 50, 51) of the sliding and sealing surface (6, 29, 43) is a circle.

11. The sliding bearing according to claim 1 wherein the width of the sealing part (17, 25, 26, 44, 50, 51) of the sliding and sealing surface (6, 29, 43) is equal to zero when the sliding piece (3, 27, 40) touches the supporting surface (4, 39, 41) and the contact between the sliding piece (3, 27, 40) and the supporting surface (4, 39, 41) is in the shape of a line.

12. The sliding bearing according to claim 1 wherein the recesses (24, 26) are produced by etching.

13. The sliding bearing according to claim 1 wherein said bearing is positioned between the piston slippers and swash plate of a hydrostatic axial piston machine.

14. The sliding bearing according to claim 1 wherein the sealing part (17, 25, 26, 44, 50, 51) of the sliding and sealing surface (6, 29, 43) is a rectangle.

15. The sliding bearing according to claim 1 wherein said sliding bearing engages the bearing of a cylinder block on a valve plate of a hydrostatic axial piston machine.

16. The sliding bearing according to claim 1 wherein said sliding bearing engages the bearing on a valve plate of a hydrostatic axial piston machine.

17. The sliding bearing according to claim 1 wherein said sliding bearing engages a bearing of a swash plate of a hydrostatic axial piston machine.

18. The sliding bearing according to claim 1 wherein said sliding bearing engages a bearing of the shaft with a driving flange of a hydrostatic axial piston machine.

19. The sliding bearing according to claim 1 wherein said sliding bearing engages a bearing on a valve plate of a bent axis hydrostatic axial piston machine.

20. The sliding bearing of claim 1 wherein the supporting surface (4, 39, 41) is curved.

21. The sliding bearing of claim 20 wherein said sliding bearing engages an axial bearing of a shaft.

22. The sliding bearing of claim 20 wherein said sliding bearing engages a radial bearing of a shaft.

23. The sliding bearing of claim 1 wherein the lubrication gap is of sufficient size that flow of lubrication fluid therethrough is positive in all directions and a pressure gradient of said lubrication fluid declines in a direction of flow.

* * * * *